US010623079B2

United States Patent
Kumagai

(10) Patent No.: US 10,623,079 B2
(45) Date of Patent: Apr. 14, 2020

(54) BASE STATION APPARATUS AND ASSIGNING METHOD

(71) Applicant: FUJITSU LIMITED, Kawasaki-shi, Kanagawa (JP)

(72) Inventor: Shinya Kumagai, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/221,529

(22) Filed: Dec. 16, 2018

(65) Prior Publication Data

US 2019/0215050 A1 Jul. 11, 2019

(30) Foreign Application Priority Data

Jan. 11, 2018 (JP) .................................. 2018-002968

(51) Int. Cl.
| | |
|---|---|
| *H04B 7/06* | (2006.01) |
| *H04L 5/00* | (2006.01) |
| *H04B 7/0408* | (2017.01) |
| *H04B 7/0452* | (2017.01) |

(52) U.S. Cl.
CPC ......... *H04B 7/0697* (2013.01); *H04B 7/0408* (2013.01); *H04B 7/0452* (2013.01); *H04B 7/0617* (2013.01); *H04L 5/0016* (2013.01); *H04L 5/0019* (2013.01); *H04L 5/0023* (2013.01); *H04L 5/0051* (2013.01); *H04L 5/0064* (2013.01)

(58) Field of Classification Search
CPC ...... H04B 7/04; H04B 7/0404; H04B 7/0408; H04B 7/0417; H04B 7/0452; H04B 7/0456; H04B 7/061; H04B 7/0617; H04B 7/0626; H04B 7/0632; H04B 7/0634; H04B 7/0639; H04B 7/0697; H04B 7/088; H04L 5/0019; H04L 5/0051; H04L 5/0064; H04L 5/0016; H04L 5/0023
USPC ........ 375/259, 260, 262, 265, 267; 370/310, 370/335, 342; 455/456.5, 456.6, 463, 24
See application file for complete search history.

(56) References Cited

U.S. PATENT DOCUMENTS

| | | | | |
|---|---|---|---|---|
| 7,190,748 | B2 * | 3/2007 | Kim ..................... | H04B 7/0848 375/345 |
| 9,923,612 | B2 * | 3/2018 | Ji ......................... | H04B 7/2621 |
| 2008/0318606 | A1 * | 12/2008 | Tsutsui ................. | H04B 7/0417 455/500 |
| 2015/0016379 | A1 * | 1/2015 | Nam .................... | H04B 7/0456 370/329 |

(Continued)

FOREIGN PATENT DOCUMENTS

JP 2014-131202 7/2014

*Primary Examiner* — Young T Tse
(74) *Attorney, Agent, or Firm* — Fujitsu Patent Center

(57) ABSTRACT

A base station includes a processor. The processor is configured to transmit, to each of terminal devices, a data signal and a reference signal used for demodulating the data signal while the data signal and the reference signal are spatially multiplexed, by forming a plurality of beams while using a plurality of antenna elements. The processor is configured to calculate an index value related to correlation among the terminal devices, on a basis of propagation path information between any of the terminal devices subject to the spatial multiplexing. The processor is configured to assign the reference signals to the terminal devices subject to the spatial multiplexing in accordance with the index values among the terminal devices.

8 Claims, 13 Drawing Sheets

(56) References Cited

U.S. PATENT DOCUMENTS

| | | | |
|---|---|---|---|
| 2015/0349866 A1* | 12/2015 | Benjebbour | H04L 5/00 370/329 |
| 2016/0065282 A1* | 3/2016 | Zhang | H04W 16/10 370/281 |
| 2016/0143055 A1* | 5/2016 | Nammi | H04W 74/006 370/329 |

* cited by examiner

BASE STATION APPARATUS AND ASSIGNING METHOD

CROSS-REFERENCE TO RELATED APPLICATION

This application is based upon and claims the benefit of priority of the prior Japanese Patent Application No. 2018-002968, filed on Jan. 11, 2018, the entire contents of which are incorporated herein by reference.

FIELD

The embodiments discussed herein are related to a base station apparatus and an assigning method.

BACKGROUND

In recent years, as a technique for increasing communication capacity, Multi-User Multiple-Input Multiple-Output (MU-MIMO) schemes are known, for example, by which data signals intended for a plurality of terminal devices (represented by pieces of User Equipment (UEs)) are spatially multiplexed by using mutually the same wireless resource. A base station calculates transmission weights by using a method such as, for example, a Zero-Forcing method or a Minimum Mean Square Error (MMSE) method, while using channel information between the UEs that are subject to the spatial multiplexing process. Further, by forming beams by multiplying the data signals by the calculated transmission weights, the base station is able to reduce signal interference between the UEs.

FIG. 13 is a drawing for explaining an example of a cause of degradation of a Signal to Interference Noise Ratio (SINR) between a base station and UEs. In the wireless system illustrated in FIG. 13, there is a discrepancy between ideal channel information H used for calculating the transmission weights and actual channel information H'. As the discrepancy becomes larger, signal interference between the UEs also increases, and the SINR thereof is also degraded. Further, as the SINR is degraded, demodulation capability for the data signals is also degraded. In addition, for example, also when correlation of channels between UEs becomes higher as a result of the UEs being positioned closer to each other, degradation of the SINR becomes significant.

In a wireless system using a Long Term Evolution (LTE) scheme or a New Radio (NR) scheme, for example, UEs demodulate data signals by using DeModulation Reference Signals (DMRSs) received from a base station. In that situation, the base station multiplies the DMRSs by the same transmission weights as those used for multiplying the data signals and further transmits the multiplied DMRSs to the UEs.

Each of the UEs refers to the DMRS received from the base station and estimates channel information about a channel used for propagating the data signal. Further, each of the UEs demodulates the data signal by using the estimated channel information. However, at each of the UEs, as the SINR becomes degraded, the level of precision for estimating the channel information also becomes degraded. As a result, the demodulation capability for the data signals is also degraded.

To cope with this situation, according to a NR scheme, for example, orthogonal DMRS ports (hereinafter, simply "orthogonal ports") which are orthogonal to one another and of which the maximum quantity is 12 are defined for the purpose of improving the level of precision for the estimation of the channel information made by the UEs. In this situation, because the orthogonal ports use mutually-different time periods, frequencies, or codes, even when there is a discrepancy (or an error) in the channel information used for calculating the transmission weights, no signal interference will occur among the UEs. However, for example, when thirteen or more UEs are subject to the spatial multiplexing process, using only the orthogonal ports is not sufficient. In that situation, non-orthogonal DMRS ports (hereinafter, simply "non-orthogonal ports") will be adopted by which signal sequences of the DMRSs are changed by using scramble IDs or virtual cell IDs, while using the same time period, frequency, or code with the orthogonal ports. As a result, for example, even when the spatial multiplexing process is to be performed on UEs of which the quantity exceeds the number of orthogonal ports, it is possible to reduce signal interference among the UEs.

Patent Literature 1: Japanese Laid-open Patent Publication No. 2014-131202

However, at the base station, even when non-orthogonal ports are assigned to one or more of the UEs, because orthogonalization of the DMRS ports is not perfect, there may be a discrepancy (an error) in the channel information used for calculating the transmission weights, which may lead to signal interference among the UEs. In other words, the base station is not able to assign an optimal DMRS port, i.e., an optimal reference signal to each of the UEs. As a result, as the signal interference between UEs becomes larger, the SINRs between the two become degraded. Accordingly, the demodulation capability for the data signals is also degraded.

SUMMARY

According to an aspect of an embodiment, a base station apparatus includes a processor. The processor is configured to transmit, to each of terminal devices, a data signal and a reference signal used for demodulating the data signal while the data signal and the reference signal are spatially multiplexed, by forming a plurality of beams while using a plurality of antenna elements. The processor is configured to calculate an index value related to correlation among the terminal devices, on a basis of propagation path information between any of the terminal devices subject to the spatial multiplexing. The processor is configured to assign the reference signals to the terminal devices subject to the spatial multiplexing in accordance with the index values among the terminal devices.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. The present disclosure is not limited to the exemplary embodiments. Further, it is possible to combine any of the embodiments described below as appropriate, as long as no conflict occurs from the combinations.

[a] First Embodiment

Figure 1:
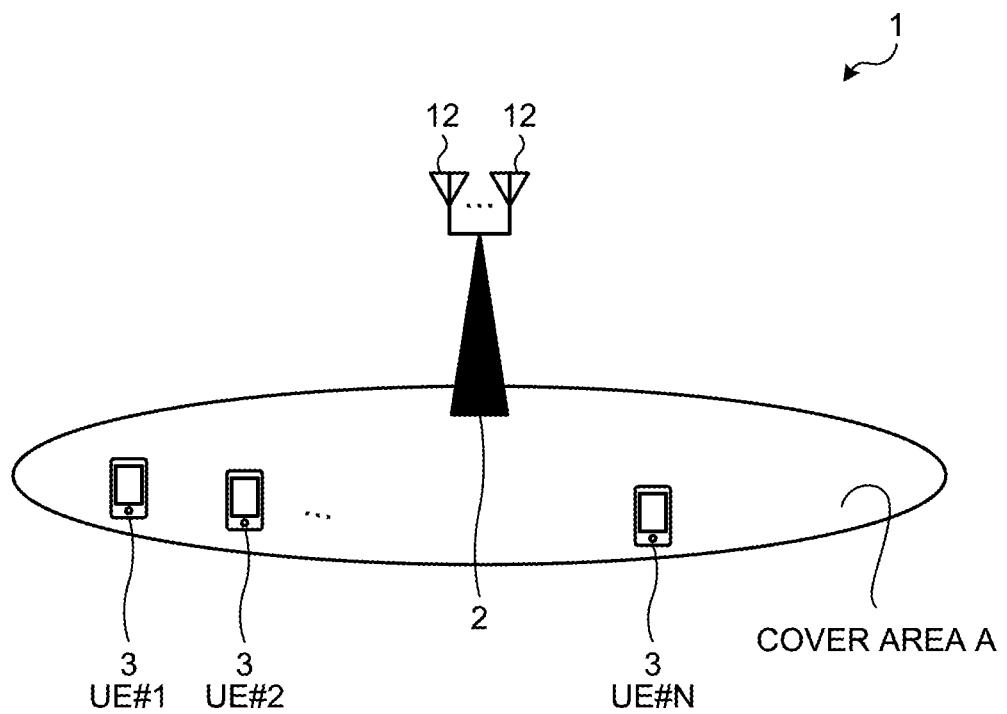
FIG. 1 is a drawing for explaining an example of a wireless system according to a first embodiment.

FIG. 1 is a drawing for explaining an example of a wireless system 1 according to a first embodiment. The wireless system 1 illustrated in FIG. 1 includes a base station 2 and a plurality pieces of User Equipment (UEs) 3. The base station 2 is a base station apparatus that forms a cover area A with a plurality of beams, while using antenna elements 12 of which the quantity is equal to N. Further, the base station 2 wirelessly communicates with the UEs 3 that are present in the cover area A. The UEs 3 are terminal devices #1, #2, . . . , and # N configured with smartphones or the like, for example, that each wirelessly communicate with the base station 2. The wireless system 1 may be, for example, a wireless system using a Long Term Evolution (LTE) scheme, a New Radio (NR) scheme, or the like. By using the antenna elements 12, the base station 2 transmits, to each of the UEs 3, a data signal and a DeModulation Reference Signal (DMRS) that are spatially multiplexed.

Figure 2:
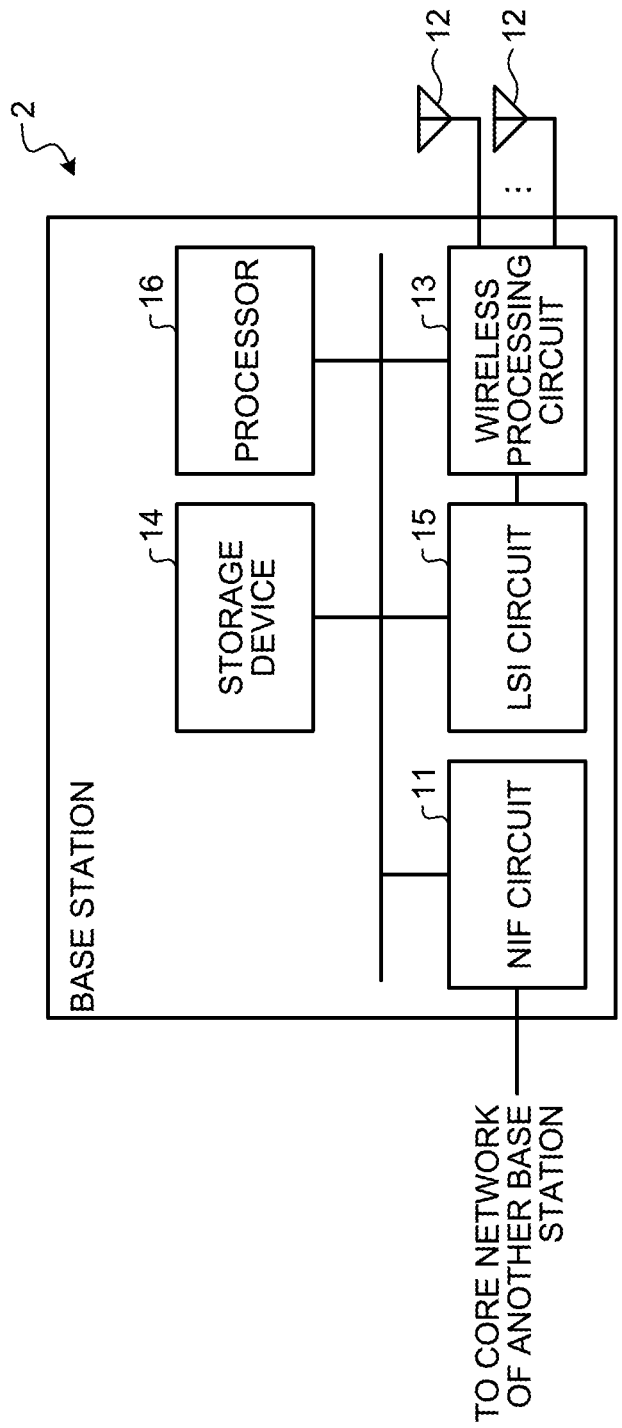
FIG. 2 is a block diagram illustrating an example of a hardware configuration of a base station according to the first embodiment.

FIG. 2 is a block diagram illustrating an example of a hardware configuration of the base station 2 according to the first embodiment. The base station 2 illustrated in FIG. 2 includes a Network Interface (NIF) circuit 11, the plurality of antenna elements 12, a wireless processing circuit 13, a storage device 14, a Large Scale Integration (LSI) circuit 15, and a processor 16. The NIF circuit 11 is an interface (IF) circuit that controls wired communication to and from a core network connecting to another base station 2. The wireless processing circuit 13 is an IF circuit that controls wireless communication with the UEs 3 via the antenna elements 12. The storage device 14 is a device storing various types of information therein. The LSI circuit 15 is a circuit that exercises various types of control. The processor 16 controls the entirety of the base station 2.

Figure 3:
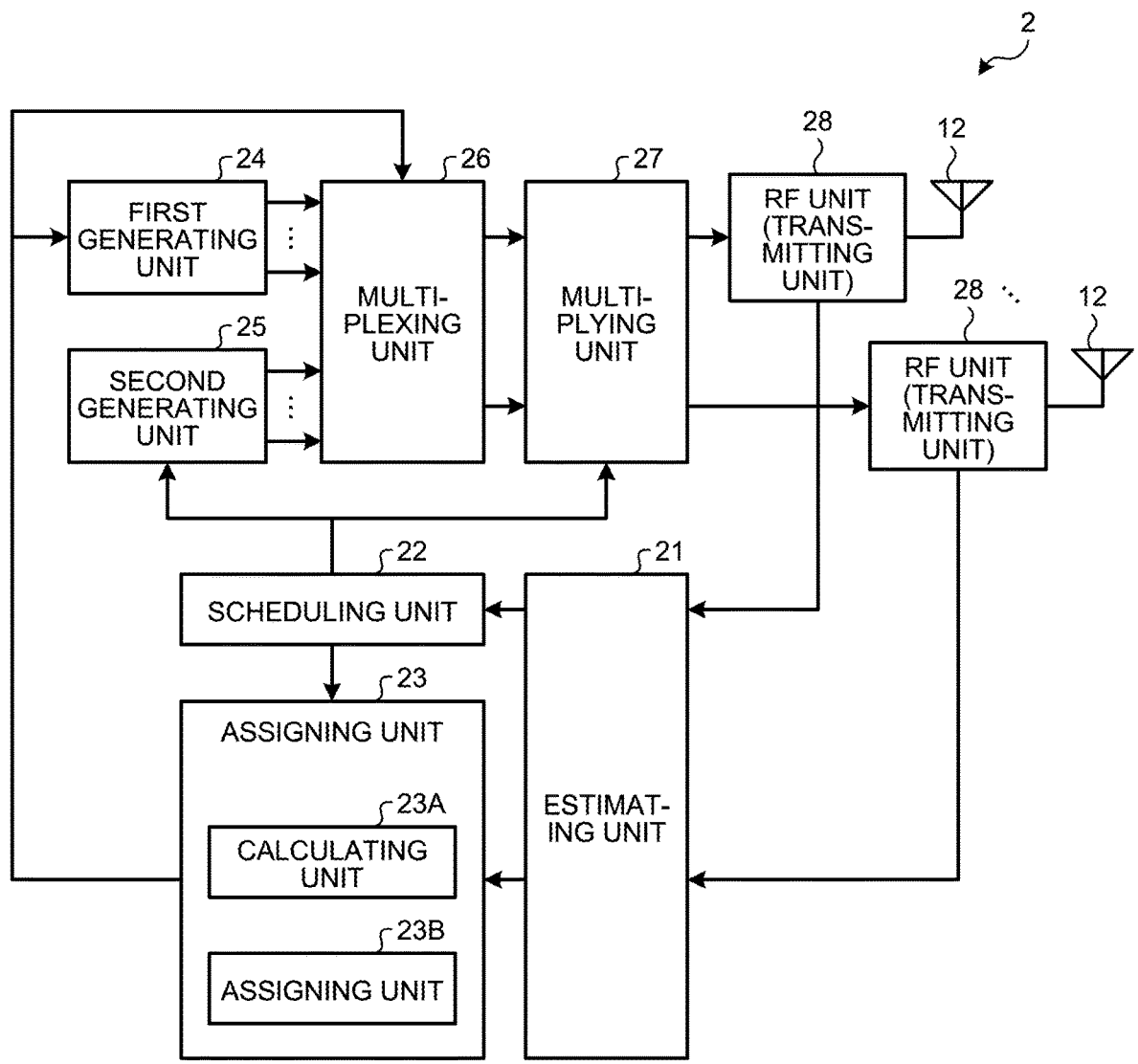
FIG. 3 is a block diagram illustrating an example of a functional configuration of the base station.

FIG. 3 is a block diagram illustrating an example of a functional configuration of the base station 2. The base station 2 illustrated in FIG. 3 functions as, for example, an estimating unit 21, a scheduling unit 22, an assigning unit 23, a first generating unit 24, a second generating unit 25, a multiplexing unit 26, and a multiplying unit 27, as a result of executing a computer program stored in the storage device 14, for example. Further, the assigning unit 23 includes a calculating unit 23A and an assigning unit 23B. The wireless processing circuit 13 includes a plurality of Radio Frequency (RF) units 28 serving as transmitting units.

The estimating unit 21 estimates a channel response vector $h_u$ with each of the UEs 3 by using Mathematical Formula 1 on the basis of either a reference signal or a feedback signal from the UE 3.

$$h_u = [h_{u,1} h_{u,2} \ldots h_{u,N_{ANT}}]. \tag{1}$$

From among the plurality of UEs 3, the scheduling unit 22 selects, on the basis of a predetermined selection rule, UEs 3 of which the quantity is equal to K and which are present in the cover area A and are implementing an MU-MIMO scheme. Examples of the predetermined selection rule include a Proportional Fair rule that uses estimated channel response vectors and a round-robin rule that provides communication opportunities evenly. The scheduling unit 22 calculates transmission weights to be applied to data signals and to DMRSs serving as reference signals, by implementing the Zero-Forcing method or the MMSE method, for example, while using the channel response vectors. Although the scheduling unit 22 is described above as calculating the transmission weights by using the channel response vectors for example, the scheduling unit 22 may select one or more arbitrary transmission weights from among a plurality of transmission weight candidates that are set in advance. The configuration may be modified as appropriate.

By using Mathematical Formula 2, the calculating unit 23A included in the assigning unit 23 calculates a correlation coefficient ρ(m,n) for the channels of each pair of UEs among the selected UEs 3 of which the quantity is equal to K. The symbol [.]H expresses a Hermitian conjugate of a matrix. Further, the symbols ||•|| and |•| expresses a norm and an absolute value, respectively. The correlation coefficient of each pair of UEs is an index value related to correlation between the terminal devices.

$$\rho_{m,n} = \left| \frac{h_m\, h_n^H}{\|h_m\| \, \|h_n\|} \right|^2 \tag{2}$$

On the basis of the correlation coefficient ρ(m,n) serving as the index value of each pair of UEs, the assigning unit 23B included in the assigning unit 23 assigns a DMRS port to each of the pairs of UEs. In this situation, the DMRS port is a port used for demodulating the data signal for each of the UEs 3 and may be an orthogonal port or a non-orthogonal port. The orthogonal port corresponds to a first reference signal of a port that uses mutually-different time periods, frequencies, or codes among DMRSs. The non-orthogonal port corresponds to a second reference signal of a port that uses mutually-different signal sequences (e.g., signal sequences using mutually-different scramble IDs or virtual cell IDs) while using mutually the same time period, frequency, or code among DMRSs. When the correlation coefficient ρ(m,n) of a pair of UEs is smaller than a threshold value, the assigning unit 23 sets a flag (m,n) and a flag (n,m) of the pair of UEs to "0". On the contrary, when the correlation coefficient ρ(m,n) of a pair of UEs is not smaller than the threshold value, the assigning unit 23 sets the flag (m,n) and the flag (n,m) of the pair of UEs to "1". In this situation, the threshold value may be set as a parameter or may be set in accordance with the number of orthogonal ports that are usable.

The assigning unit 23 designates a reference UE (u) from among undesignated UEs 3 in all the pairs of UEs. Further, for each reference UE (u), the assigning unit 23 sets a flag (n,u) and a flag (u,n) to "1" with respect to such pairs of UEs of which the correlation coefficients ρ(u,n) are ranked in the X-th highest place or higher. In this situation, X denotes the number of orthogonal ports that are available to be assigned, for example. Further, for each reference UE (u), the assigning unit 23 sets the flag (n,u) and the flag (u,n) to "0" with respect to such pairs of UEs of which the correlation coefficients are ranked in the (X+1)-th highest place or lower.

On the basis of the result of the assignment made by the assigning unit 23 for each of the selected UEs 3, the first generating unit 24 generates either an orthogonal port or a non-orthogonal port for the DMRS of the UE 3. The second generating unit 25 generates a data signal for each of the selected UEs 3. The multiplexing unit 26 spatially multiplexes the DMRS and the data signal for each of the UEs 3 by using mutually-different time periods or frequency resources. The multiplying unit 27 multiplies the DMRS and the data signal for each of the UEs 3 by the transmission weight provided from the scheduling unit 22. Each of the RF units 28 is, for example, a transmitting unit that converts the DMRS and the data signal resulting from the multiplication into a wireless signal and further transmits the wireless signal to a corresponding one of the UEs 3 via a corresponding one of the antenna elements 12.

Figure 4:
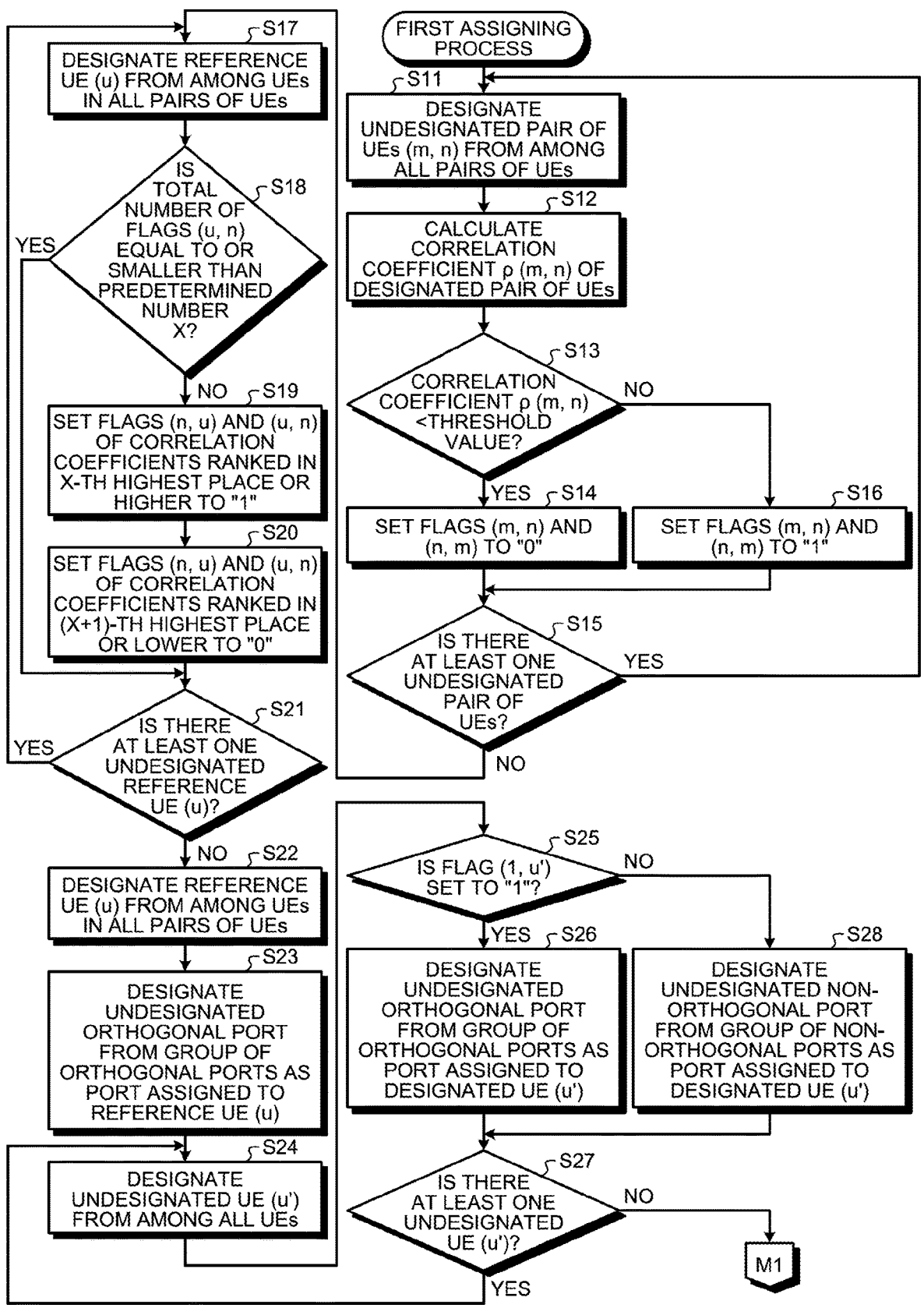
FIG. 4 is a flowchart illustrating an example of a processing operation performed by the base station in relation to a first assigning process according to the first embodiment.
Figure 5:
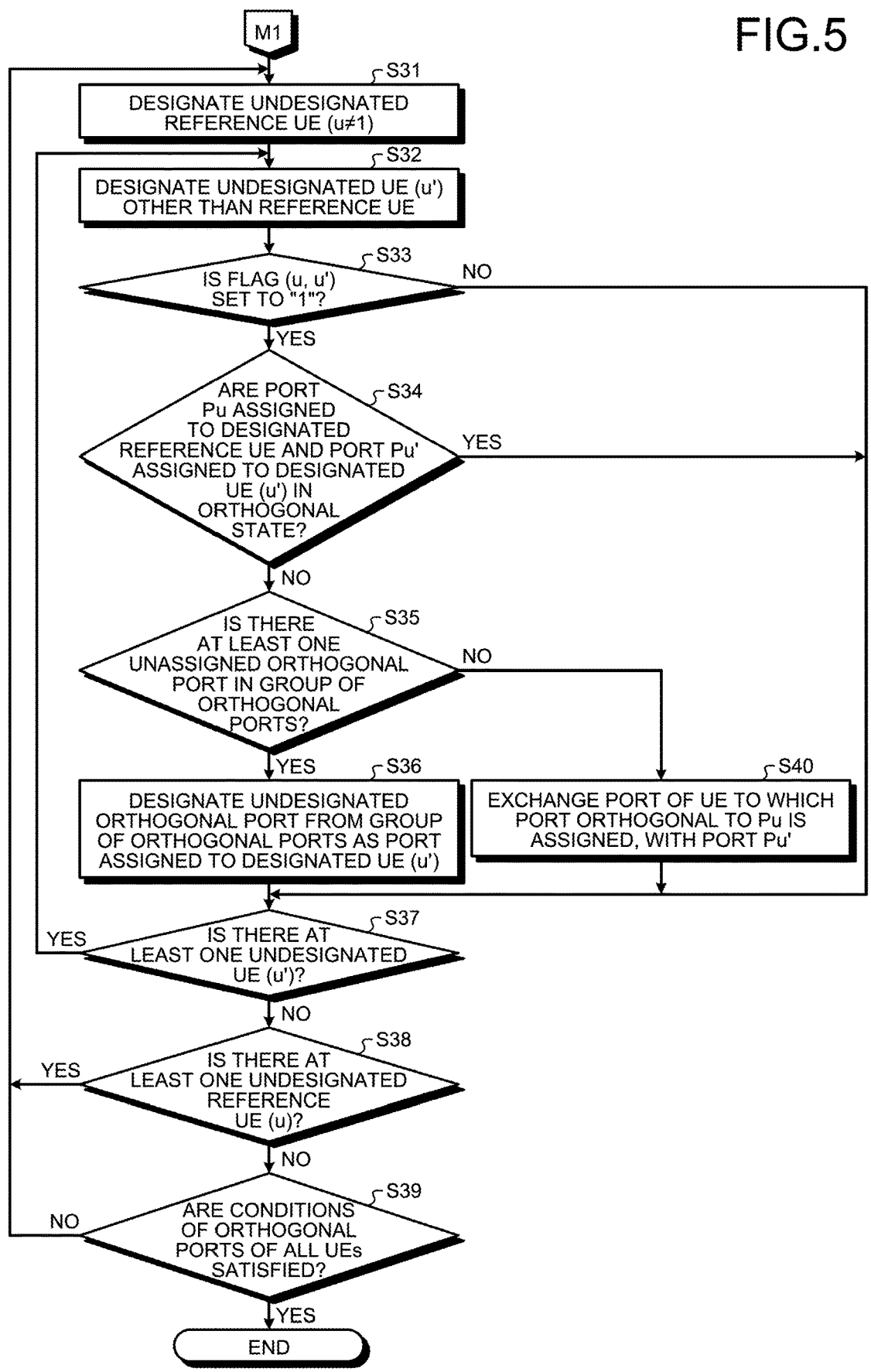
FIG. 5 is another flowchart illustrating the example of the processing operation performed by the base station in relation to the first assigning process according to the first embodiment.

Next, an operation performed by the wireless system 1 according to the first embodiment will be explained. FIGS. 4 and 5 present a flowchart illustrating an example of a processing operation performed by the base station 2 in relation to a first assigning process according to the first embodiment. For the sake of convenience in the explanation, the number of UEs 3 that are present in the cover area A within the wireless system 1 is assumed to be K.

The assigning unit 23 provided in the base station 2 specifies an arbitrary pair of UEs (m,n) from among all the pairs of UEs made from the selected UEs which are present in the cover area A and of which the quantity is equal to K (step S11). By using Mathematical Formula 2, the calculating unit 23A included in the assigning unit 23 calculates the correlation coefficient ρ(m,n) of the specified pair of UEs (m,n) (step S12).

The assigning unit 23 judges whether or not the correlation coefficient ρ(m,n) of the specified pair of UEs (m,n) is smaller than the threshold value (step S13). When the correlation coefficient ρ(m,n) of the specified pair of UEs (m,n) is smaller than the threshold value (step S13: Yes), the assigning unit 23 sets the flags (m,n) and (n,m) of the specified pair of UEs to "0" (step S14). Further, after setting the flags of the pair of UEs to "0", the assigning unit 23 judges whether or not there is at least one undesignated pair of UEs (m,n) (step S15). When there is at least one undesignated pair of UEs (step S15: Yes), the assigning unit 23 proceeds to step S11 where the assigning unit 23 specifies an undesignated pair of UEs.

On the contrary, when the correlation coefficient ρ(m,n) of the specified pair of UEs (m,n) is not smaller than the threshold value (step S13: No), the assigning unit 23 sets the flags (m,n) and (n,m) of the specified pair of UEs to "1" (step S16). Subsequently, after setting the flags (m,n) and (n,m) of the pair of UEs to "1", the assigning unit 23 proceeds to step S15 where the assigning unit 23 judges whether or not there is at least one undesignated pair of UEs (m,n). When the correlation coefficient ρ(m,n) of any pair of UEs is smaller than the threshold value, the assigning unit 23 sets the flags (m,n) and (n,m) of the pair of UEs to "0". When the correlation coefficient ρ(m,n) of any pair of UEs is not smaller than the threshold value, the assigning unit 23 sets the flags (m,n) and (n,m) of the pair of UEs to "1". As a result, the assigning unit 23 sets a flag used for assigning either an orthogonal port or a non-orthogonal port for each pair of UEs.

When there is no undesignated pair of UEs (m,n) (step S15: No), the assigning unit 23 designates a reference UE (u) from among the UEs 3 in all the pairs of UEs (step S17). The assigning unit 23 judges whether or not the total number of flags (u,n) of the designated reference UE (n) is equal to or smaller than the predetermined number X (step S18). In this situation, the predetermined number X may be the number of orthogonal ports, for example, but is not limited to this example, and may be modified as appropriate.

When the total number of flags (u,n) of the reference UE (u) is not equal to or smaller than the predetermined number X (step S18: No), the assigning unit 23 sets the flag (n,u) and the flag (u,n) of such correlation coefficients that are ranked in the X-th highest place or higher to "1" (step S19). Further, the assigning unit 23 sets the flag (n,u) and the flag (u,n) of such correlation coefficients that are ranked in the (X+1)-th highest place or lower to "0" (step S20). After that, the assigning unit 23 judges whether or not there is at least one undesignated reference UE (u) (step S21). When there is at least one undesignated reference UE (u) (step S21: Yes), the assigning unit 23 proceeds to step S17 where the assigning unit 23 designates an undesignated reference UE.

When the total number of flags (u,n) of the reference UE (u) is equal to or smaller than the predetermined number X (step S18: Yes), the assigning unit 23 proceeds to step S17 where the assigning unit 23 judges whether or not there is at least one undesignated reference UE (u). In other words, when the total number of flags of the reference UE is not equal to or smaller than the predetermined X, the assigning unit 23 sets the flag (u,n) and the flag (n,u) of such correlation coefficients that are ranked in the X-th highest place or higher to "1" and sets the flag (u,n) and the flag (n,u) of such correlation coefficients that are ranked in the (X+1)-th highest place or lower to "0".

On the contrary, when there is no undesignated reference UE (u) (step S21: No), the assigning unit 23 designates a reference UE (u=1) from among the UEs 3 of all the pairs of UEs (step S22). After that, the assigning unit 23B included in the assigning unit 23 assigns an undesignated orthogonal port from a group of orthogonal ports to the reference UE (u=1) (step S23). In this situation, the group of orthogonal ports is a group of ports in which undesignated orthogonal ports that are available to be assigned are managed. Further, for the sake of convenience in the explanation, the reference UE 3 is assumed to be a UE satisfying u=1, but is not limited to this example and may be modified as appropriate.

Further, from among all the UEs 3, the assigning unit 23 designates an undesignated UE (1,u') other than the reference UE (u=1) (step S24). The assigning unit 23 judges whether or not the flag (1,u') is set to "1" (step S25). When the flag (1,u') is set to "1" (step S25: Yes), the assigning unit 23B included in the assigning unit 23 assigns an undesignated orthogonal port from the group of orthogonal ports to the designated UE (u') (step S26) and further judges whether or not there is at least one undesignated UE (u') (step S27).

When there is at least one undesignated UE (u') (step S27: Yes), the assigning unit 23 proceeds to step S24 where the assigning unit 23 designates the undesignated UE (u'). When the flag (1,u') is not set to "1" (step S25: No), i.e., when the flag (1,u') is set to "0", the assigning unit 23B assigns an undesignated non-orthogonal port from a group of non-orthogonal ports to the designated UE (u') (step S28). In this situation, the group of non-orthogonal ports is a group of ports in which undesignated non-orthogonal ports that are available to be assigned are managed. The assigning unit 23 proceeds to step S27 where the assigning unit 23 judges whether or not there is at least one undesignated UE (u'). When there is no undesignated UE (u') (step S27: No), the assigning unit 23 proceeds to M1 illustrated in FIG. 5.

At M1 illustrated in FIG. 5, the assigning unit 23 designates an undesignated reference UE from among the UEs 3 other than the UE "u=1" (step S31). Further, the assigning unit 23 designates an undesignated UE (u') other than the designated reference UE (u=1) (step S32). The assigning unit 23 judges whether or not the flag (u,u') is set to "1" (step S33).

When the flag (u,u') is set to "1" (step S33: Yes), the assigning unit 23 judges whether or not a port Pu assigned to the designated reference UE and a port Pu' assigned to the designated UE (u') are in an orthogonal relationship with each other (step S34).

When the assigned port Pu and the assigned port Pu' are not in an orthogonal relationship with each other (step S34: No), the assigning unit 23 determines that these ports are in a non-orthogonal relationship with each other and further judges whether or not there is at least one unassigned orthogonal port in the group of orthogonal ports (step S35). When there is at least one unassigned orthogonal port in the group of orthogonal ports (step S35: Yes), the assigning unit 23B included in the assigning unit 23 assigns an undesignated orthogonal port from the group of orthogonal ports to the designated UE (u') (step S36) and further judges whether or not there is at least one undesignated UE (u') (step S37).

When there is at least one undesignated UE (u') (step S37: Yes), the assigning unit 23 proceeds to step S32 where the assigning unit 23 designates an undesignated UE (u'). When the flag (u,u') is set to "0" (step S33: No) or when the assigned port Pu and the assigned port Pu' are in an orthogonal relationship (step S34: Yes), the assigning unit 23 proceeds to step S37 where the assigning unit 23 judges whether or not there is at least one undesignated UE (u').

When there is no undesignated UE (u') (step S37: No), the assigning unit 23 judges whether or not there is at least one undesignated reference UE (u) (step S38). When there is at least one undesignated reference UE (u) (step S38: Yes), the assigning unit 23 proceeds to step S31 where the assigning unit 23 designates an undesignated reference UE. On the contrary, when there is no undesignated reference UE (u) (step S38: No), the assigning unit 23 judges whether or not conditions of orthogonal ports of all the UEs 3 are satisfied (step S39).

When the conditions of orthogonal ports of all the UEs 3 are satisfied (step S39: Yes), the assigning unit 23 ends the processing operation illustrated in FIG. 5. On the contrary, when the conditions of orthogonal ports of all the UEs 3 are not satisfied (step S39: No), the assigning unit 23 proceeds to step S31 where the assigning unit 23 designates an undesignated reference UE. When there is no unassigned orthogonal port in the group of orthogonal ports (step S35: No), the assigning unit 23B exchanges the port of the UE 3 to which a port orthogonal to the assigned port Pu of the reference UE 3 is assigned, with the assigned port Pu' assigned to the designated UE 3 (step S40). Subsequently, after exchanging the ports with each other, the assigning unit 23B proceeds to step S37.

Figure 6:
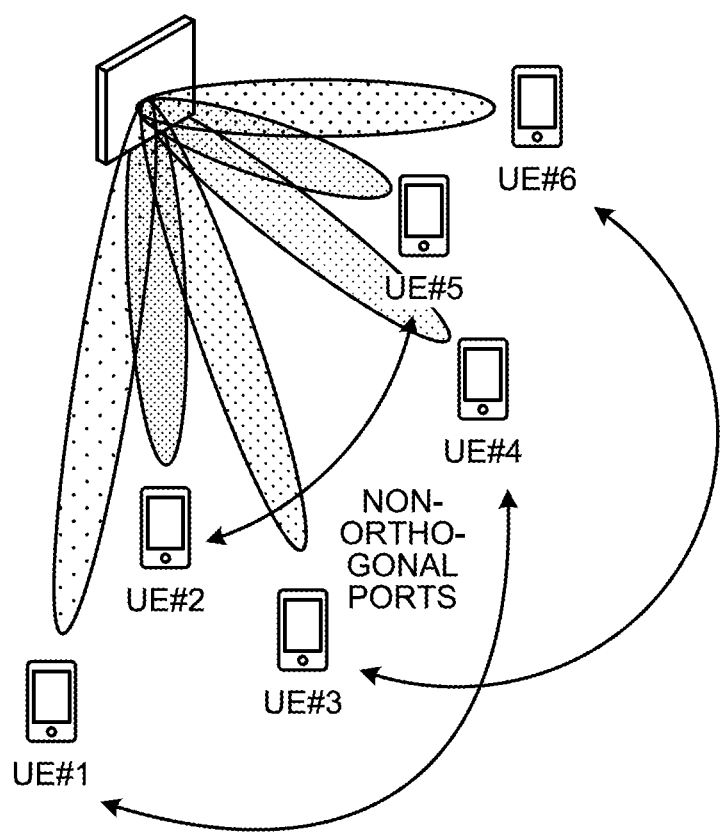
FIG. 6 is a drawing for explaining an example of an operation performed by the base station when assigning a DMRS port to each UE.

FIG. 6 is a drawing for explaining an example of an operation performed by the base station 2 to assign DMRS ports to the UEs 3. For the sake of convenience in the explanation, it is assumed that six UEs (#1 to #6) are present in the cover area A in the base station 2. In the wireless system 1, UE #1 and UE #4 are in a non-orthogonal relationship, while UE #2 and UE #5 are in a non-orthogonal relationship, and UE #3 and UE #6 are in a non-orthogonal relationship. Further, UE #1, UE #2, and UE #3 are in an orthogonal relationship, while UE #4, #5, and #6 are in an orthogonal relationship.

Among the correlation coefficients of the channels corresponding to the pairs of UEs, the base station 2 according to the first embodiment assigns orthogonal ports to pairs of UEs having larger correlation coefficients. When there is no more unassigned orthogonal port, the base station 2 assigns non-orthogonal ports to pairs of UEs. As a result, it is possible to improve the demodulation capability for the data signals.

The base station 2 assigns either the orthogonal ports that use mutually-different time periods, frequencies, or codes among the DMRS ports or the non-orthogonal ports that use mutually-different signal sequences while using mutually the same time period, frequency, or code among the DMRS ports. As a result, when there is no more orthogonal DMRS port left that is available to be assigned, due to an increase in the number of UEs 3 in the wireless system 1, it is possible to avoid signal interference by assigning the non-orthogonal ports.

The base station 2 calculates the correlation coefficients of the channels corresponding to the pairs of UEs, on the basis of vector inner product values related to channel responses between the UEs 3 subject to the spatial multiplexing process and the base station 2. As a result, the base station 2 is able to recognize correlation for each of the pairs of UEs.

In the first embodiment, the correlation coefficients of the channels corresponding to the pairs of UEs are compared with the threshold value. Either an orthogonal port or a non-orthogonal port is assigned to each of the UEs 3 on the basis of the result of the comparison. However, the present disclosure is not limited to this example, and the configuration may be modified as appropriate. Thus, another embodiment will be explained below as a second embodiment. Some of the constituent elements that are the same as those in the first embodiment will be referred to by using the same reference characters. The explanations of duplicate configurations and operations will be omitted.

[b] Second Embodiment

The base station 2 according to the second embodiment assigns an orthogonal port to each of the pairs of UEs of which the correlation coefficients are ranked in the X-th highest place or higher and assigns a non-orthogonal port to each of the pairs of UEs of which the correlation coefficients are ranked in the (X+1)-th highest place or lower.

Figure 7:
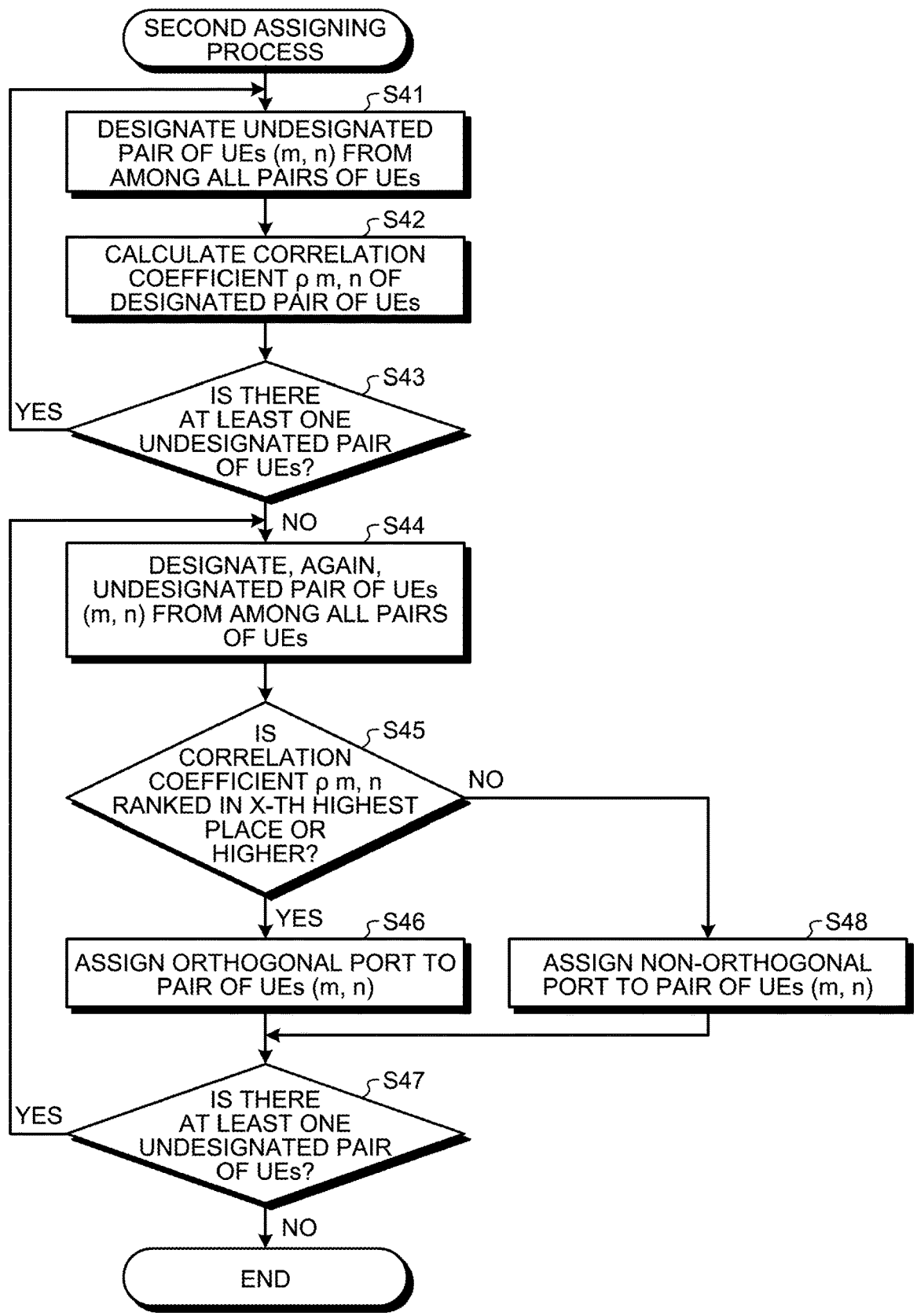
FIG. 7 is a flowchart illustrating an example of a processing operation performed by a base station in relation to a second assigning process in a wireless system according to a second embodiment.

FIG. 7 is a flowchart illustrating an example of a processing operation performed by the base station 2 in relation to a second assigning process in the wireless system 1 according to the second embodiment. In FIG. 7, the calculating unit 23A included in the assigning unit 23 provided in the base station 2 designates an arbitrary pair of UEs (m,n) from among all the pairs of UEs made from the selected UEs which are present in the cover area A and of which the quantity is equal to K (step S41) and calculates a correlation coefficient of the specified pair of UEs (m,n) by using Mathematical Formula 2 (step S42). The assigning unit 23 judges whether or not there is at least one undesignated pair of UEs (m,n) (step S43). When there is at least one undesignated pair of UEs (m,n) (step S43: Yes), the assigning unit 23 proceeds to step S41 where the assigning unit 23 designates an undesignated pair of UEs (m,n).

On the contrary, when there is no undesignated pair of UEs (m,n) (step S43: No), the assigning unit 23 designates, again, an undesignated pair of UEs (m,n) from among all the pairs of UEs (step S44). After that, the assigning unit 23 judges whether or not the correlation coefficient of the pair of UEs (m,n) designated at step S44 is ranked in the X-th highest place or higher (step S45). When the correlation coefficient of the designated pair of UEs is ranked in the X-th highest place or higher (Step S45: Yes), the assigning unit 23B included in the assigning unit 23 assigns an orthogonal port to the pair of UEs (m,n) (step S46) and judges whether or not there is at least one undesignated pair of UEs (step S47). When there is at least one undesignated pair of UEs (step S47: Yes), the assigning unit 23 proceeds to step S44 where the assigning unit 23 designates an undesignated pair of UEs.

On the contrary, when the correlation coefficient of the designated pair of UEs is not ranked in the X-th highest place or higher (step S45: No), the assigning unit 23B included in the assigning unit 23 assigns a non-orthogonal port to the pair of UEs (step S48) and proceeds to step S47 where the assigning unit 23 judges whether or not there is at least one undesignated pair of UEs. Further, when there is no undesignated pair of UEs (step S47: No), the assigning unit 23 ends the processing operation illustrated in FIG. 7.

The base station 2 according to the second embodiment assigns an orthogonal port to each of the pairs of UEs of which the correlation coefficients are ranked in the X-th highest place or higher and assigns a non-orthogonal port to each of the pairs of UEs of which the correlation coefficients are ranked in the (X+1)-th highest place or lower. As a result, it is possible to easily assign either an orthogonal port or a non-orthogonal port to each of the pairs of UEs, in accordance with the correlation coefficient thereof. Further, it is possible to improve the demodulation capability for the data signals.

The base station 2 assigns an orthogonal port to each of the pairs of UEs of which the correlation coefficients are ranked in the X-th highest place or higher and assigns a non-orthogonal port to each of the pairs of UEs of which the correlation coefficients are ranked in the (X+1)-th highest place or lower. As a result, because the DMRS of an orthogonal port is assigned to such a pair of UEs 3 having strong interference, it is possible to improve the demodulation capability for the data signals.

Further, in the wireless system 1 according to the second embodiment above, the correlation coefficients are sorted in descending order so as to assign an orthogonal port to each of the pairs of UEs of which the correlation coefficients are ranked in the X-th highest place or higher and to assign a non-orthogonal port to each of the pairs of UEs of which the correlation coefficients are ranked in the (X+1)-th highest place or lower; however, another arrangement is also acceptable in which the correlation coefficients are sorted in ascending order so as to assign an orthogonal port to each of the pairs of UEs of which the correlation coefficients are ranked in the X-th lowest place or lower and to assign a non-orthogonal port to each of the pairs of UEs of which the correlation coefficients are ranked in the (X+1)-the lowest place or higher. The configuration may be modified as appropriate.

The base station 2 according to the first and the second embodiments calculates the correlation coefficient for each of the pairs of UEs by using the channel response vectors corresponding to the UEs 3. However, another arrangement is also acceptable in which the base station 2 calculates a correlation coefficient for each of the pairs of UEs by using vectors of the transmission weights applied to the data signals and the DMRSs of the UEs 3. In that situation, the estimating unit 21 provided in the base station 2 calculates a transmission weight vector $V_m$ by using Mathematical Formula 3.

$$v_m = [v_{m,1} v_{m,2} \cdots v_{m,N_{ANT}}]^T \quad (3)$$

Further, the assigning unit 23 provided in the base station 2 calculates a correlation coefficient for each of the pairs of UEs by using the transmission weight vector while using Mathematical Formula 4.

$$\rho_{m,n} = |v_m^H v_n| \quad (4)$$

The base station 2 performs one selected from between the first assigning process and the second assigning process, on the basis of the correlation coefficient of each of the pairs of UEs calculated by using the transmission weight vectors. It is therefore possible to assign each of the pairs of UEs to either an orthogonal port or a non-orthogonal port. As a result, it is possible to improve the demodulation capability for the data signals.

In the wireless system 1 according to the first and the second embodiments above, the base station 2 is provided with the plurality of antenna elements 12, so as to wirelessly communicate with the UEs 3 via the antenna elements 12. However, the present disclosure is also applicable to a base station connecting to a plurality of Remote Radio Heads (RRHs). This embodiment will be explained below as a third embodiment.

[c] Third Embodiment

Figure 8:
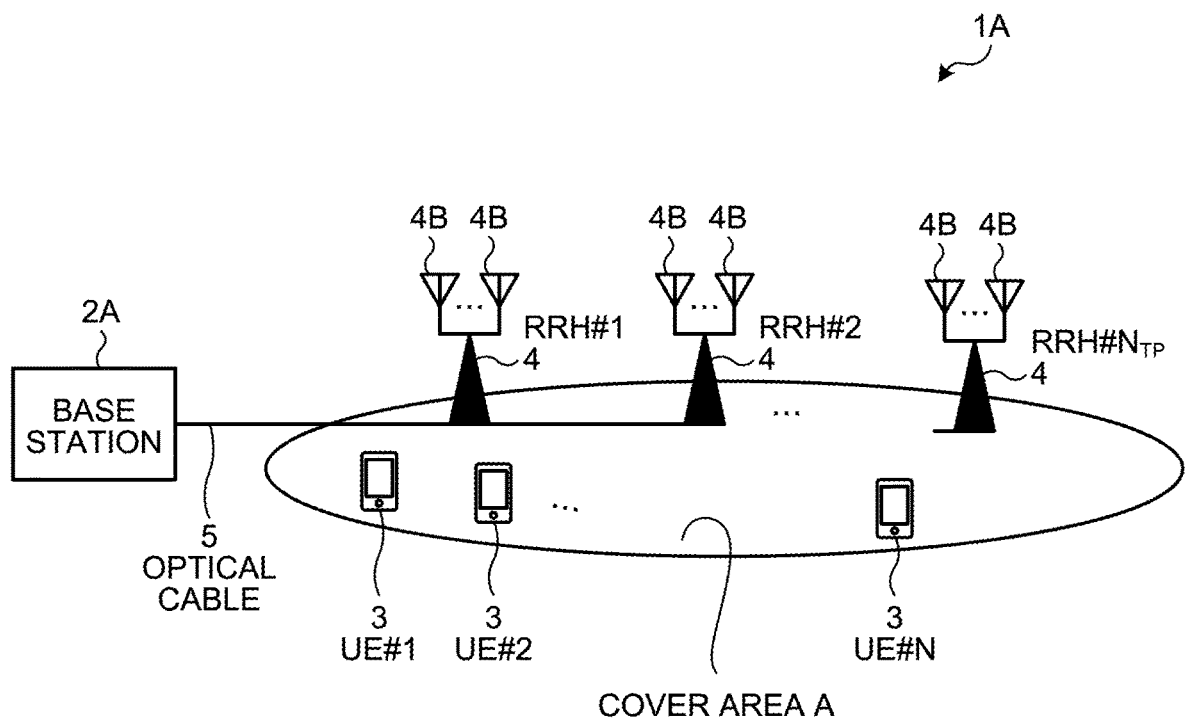
FIG. 8 is a drawing for explaining an example of a wireless system according to a third embodiment.

FIG. 8 is a drawing for explaining an example of a wireless system 1A according to the third embodiment. The wireless system 1A illustrated in FIG. 8 includes a plurality of RRHs 4, a base station 2A, and a plurality of UEs 3. The base station 2A is connected, in a wired manner, to each of the plurality of RRHs 4 via an optical cable 5, for example. Via a transmission point (TP) of each of the RRHs 4, the base station 2A wirelessly communicates with any of the UEs 3 that are present in an area of the RRH 4.

Figure 9:
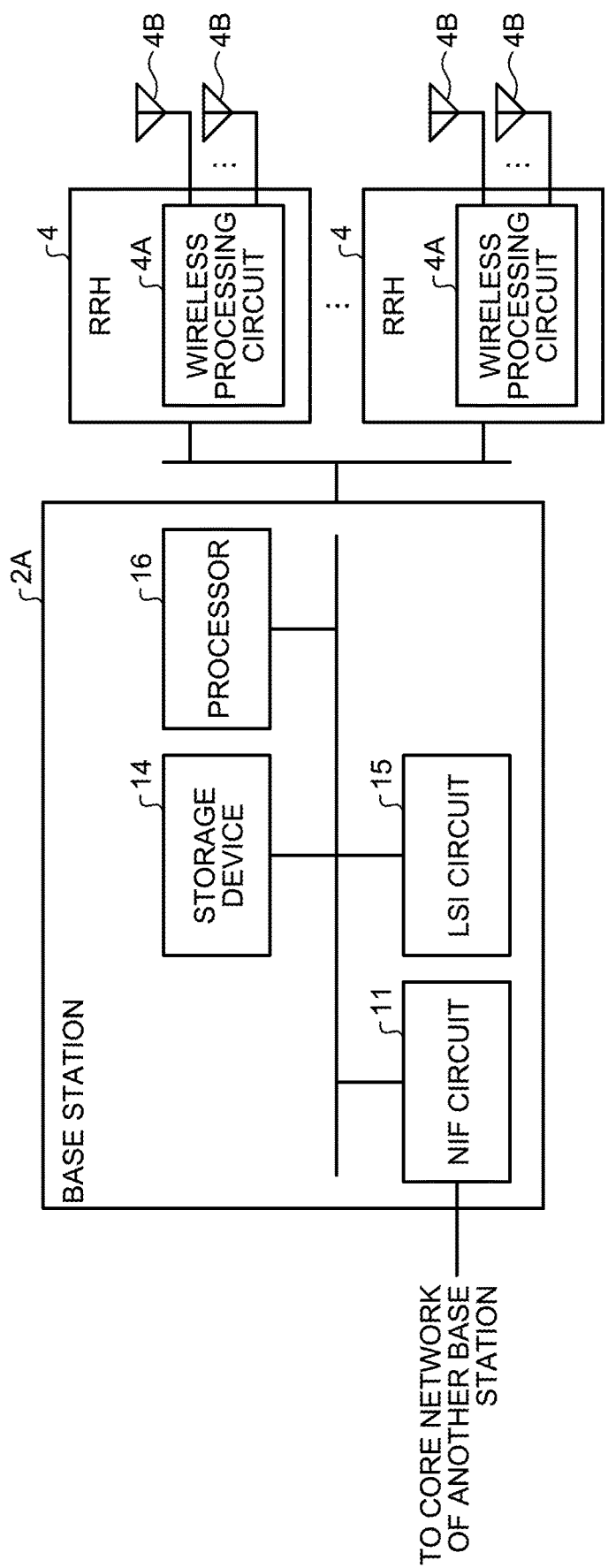
FIG. 9 is a drawing for explaining an example of a hardware configuration of a base station according to a third embodiment.

FIG. 9 is a drawing for explaining an example of a hardware configuration of a base station 2A according to the third embodiment. The base station 2A includes the NIF circuit 11, the storage device 14, the LSI circuit 15, and the processor 16. The NIF circuit 11 may be, for example, an IF circuit that controls wired communication with the RRHs 4.

Each of the RRHs 4 includes a wireless processing circuit 4A and a plurality of antennas 4B. The wireless processing circuit 4A is a circuit that processes wireless communication with any of the UEs 3 via one or more of the antennas 4B.

On the basis of a reference signal or a feedback signal from each of the UEs 3, the estimating unit 21 provided in the base station 2A estimates, for each of the RRHs 4, a reception electric power vector (hereinafter, "reception power vector") between the TPs of which the quantity is equal to N and the UEs 3 by using Mathematical Formula 5. In this situation, the reception power vector may be an average value of reception power values of the plurality of antennas 4B or the largest value among reception power levels of the plurality of antennas 4B. The configuration may be modified as appropriate.

$$p_u = [p_{u,1} p_{u,2} \cdots p_{u,N_{TP}}] \tag{5}$$

Further, the calculating unit 23A included in the assigning unit 23 provided in the base station 2A calculates a correlation coefficient for each of the pairs of UEs by using the reception power vectors of the UEs 3, while using Mathematical Formula 6.

$$\rho_{m,n} = \frac{p_m \ p_n^T}{\|p_m\| \ \|p_n\|} \tag{6}$$

Where $[\bullet]^T$ denotes transpose of matrix.

After that, on the basis of the correlation coefficients calculated by using the reception power vectors corresponding to the pairs of UEs, the base station 2A performs one selected from between the first assigning process and the second assigning process.

Even when connecting to the plurality of RRHs 4, the base station 2A according to the third embodiment assigns each of the pairs of UEs to either an orthogonal port or a non-orthogonal port on the basis of the correlation coefficients calculated by using the reception power vectors. As a result, also for the base station 2A connecting to the plurality of RRHs 4, it is possible to improve the demodulation function for the data signals.

The base station 2A calculates the correlation coefficients calculated by using the reception power vectors corresponding to the pairs of UEs, on the basis of the vector inner product values related to the reception power levels from the base station 2A for the UEs 3 subject to the spatial multiplexing process. As a result, the base station 2A is able to calculate the correlation coefficients corresponding to the pairs of UEs.

The base station 2A according to the third embodiment is described as calculating the correlation coefficients corresponding to the pairs of UEs within all the TPs; however, it is also acceptable to calculate correlation coefficients corresponding to the pairs of UEs in units of TPs. Alternatively, it is also acceptable to organize two or more TPs positioned adjacent to one another into a group and to calculate correlation coefficients corresponding to the pairs of UEs in units of groups. In those situations, it is possible to reduce the processing loads involved in the process of comparing the correlation coefficients of the pairs of UEs with one another.

In the wireless system 1 according to the second embodiment above, the base station 2 uses the vector inner product values related to the channel responses corresponding to the UEs 3; however, another arrangement is also acceptable in which the base station 2 uses vector inner product values related to beams applied to the signals transmitted to the UEs 3. This embodiment will be explained below as a fourth embodiment. For the sake of convenience in the explanation, some of the constituent elements that are the same as those in the first embodiment will be referred to by using the same reference characters. The explanations of duplicate configurations and operations will be omitted.

[d] Fourth Embodiment

Figure 10:
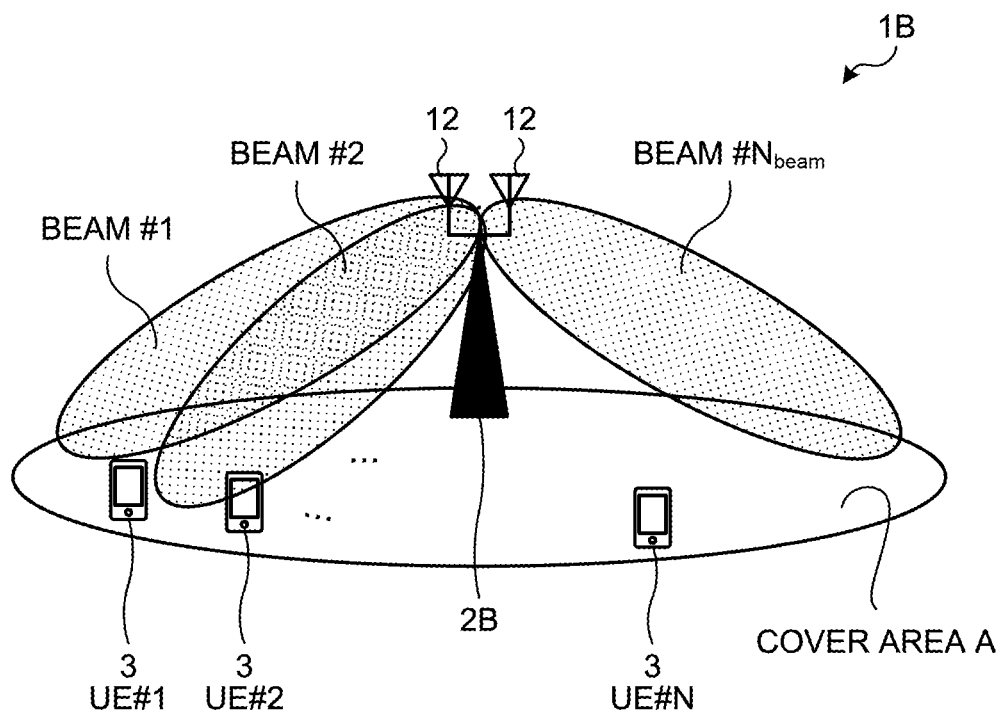
FIG. 10 is a drawing for explaining an example of a wireless system according to a fourth embodiment.

FIG. 10 is a drawing for explaining an example of a wireless system 1B according to the fourth embodiment. A base station 2B in the wireless system 1B illustrated in FIG. 10 forms the cover area A by forming beams of which the quantity is equal to N while using the plurality of antenna elements 12. The estimating unit 21 provided in the base station 2B estimates a reception power vector between the N beams and the UEs 3 by using either a reference signal or a feedback signal from each of the UEs 3, while using Mathematical Formula 7.

$$p_u = [p_{u,1} p_{u,2} \cdots p_{u,N_{beam}}] \tag{7}$$

The assigning unit 23 provided in the base station 2B calculates a correlation coefficient for each of the pairs of UEs by using the vectors related to the beams corresponding to the UEs 3, while using Mathematical Formula 6. By using the correlation coefficients corresponding to the pairs of UEs, the assigning unit 23 performs one selected from between the first assigning process and the second assigning process.

The base station 2B according to the fourth embodiment assigns each of the pairs of UEs to either an orthogonal port or a non-orthogonal port, on the basis of the correlation coefficients calculated by using the vectors related to the beams observed between the N beams output via the plurality of antenna elements 12 and the UEs 3. As a result, even when the N beams are transmitted via the plurality of antenna elements 12, it is possible to improve the demodulation function for the data signals.

The base station 2B calculates the correlation coefficients corresponding to the pairs of UEs, on the basis of the vector inner product values related to the beams applied to the data signals to the UEs 3 subject to the spatial multiplexing process. As a result, the base station 2B is able to recognize the correlation in each of the pairs of UEs.

In the wireless system 1B according to the fourth embodiment above, the DMRS ports are assigned by using only the correlation coefficients calculated from the vectors related to the beams; however, another arrangement is also acceptable in which the DMRS ports are assigned by using together therewith correlation coefficients of vectors related to pieces of propagation path information. This embodiment will be explained below as a fifth embodiment.

[e] Fifth Embodiment

Figure 11:
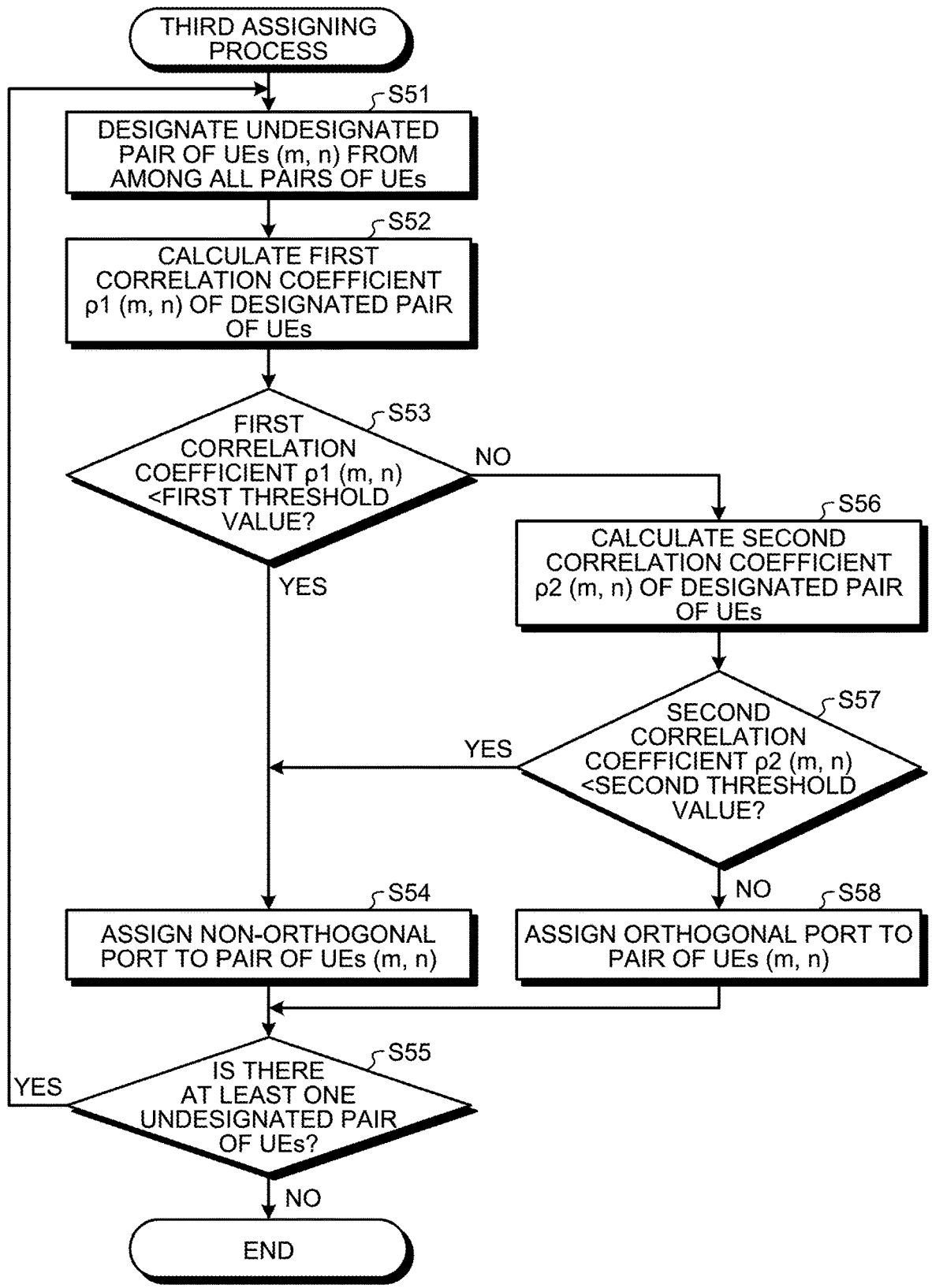
FIG. 11 is a flowchart illustrating an example of a processing operation performed by a base station in relation to a third assigning process according to a fifth embodiment.

FIG. 11 is a flowchart illustrating an example of a processing operation performed by a base station 2C in relation to a third assigning process according to the fifth embodiment. In FIG. 11, the base station 2C designates an undesignated pair of UEs (m,n) from among all the pairs of UEs (step S51). The calculating unit 23A included in the assigning unit 23 provided in the base station 2C calculates a first correlation coefficient ρ1(m,n) of the designated pair of UEs (m,n) (step S52). In this situation, the first correlation coefficient ρ1(m,n) is a correlation coefficient calculated for each of the pairs of UEs by using the reception power vectors corresponding to the UEs 3.

After calculating the first correlation coefficient ρ1(*m,n*) of the designated pair of UEs (m,n), the assigning unit 23 judges whether or not the first correlation coefficient ρ1(*m,n*) is smaller than a first threshold value (step S53). When the first correlation coefficient ρ1(*m,n*) is smaller than the first threshold value (step S53: Yes), the assigning unit 23B included in the assigning unit 23 assigns a non-orthogonal port to the pair of UEs (m,n) (step S54) and further judges whether or not there is at least one undesignated pair of UEs (m,n) (step S55).

When there is at least one undesignated pair of UEs (m,n) (step S55: Yes), the assigning unit 23 ends the processing operation illustrated in FIG. 11. On the contrary, when there is no undesignated pair of UEs (step S55: No), the assigning unit 23 proceeds to step S51 where the assigning unit 23 designates an undesignated pair of UEs.

When the first correlation coefficient ρ1(*m,n*) is not smaller than the first threshold value (step S53: No), the calculating unit 23A included in the assigning unit 23 calculates a second correlation coefficient ρ2(*m,n*) of the designated pair of UEs (step S56). In this situation, the second correlation coefficient ρ2(*m,n*) is a correlation coefficient calculated for each of the pairs of UEs (m,n) by using the channel response vectors corresponding to the UEs 3. The assigning unit 23 further judges whether or not the second correlation coefficient ρ2(*m,n*) is smaller than a second threshold value (step S57).

When the second correlation coefficient ρ2(*m,n*) is not smaller than the second threshold value (step S57: No), the assigning unit 23B included in the assigning unit 23 assigns an orthogonal port to the pair of UEs (m,n) (step S58) and proceeds to step S55. On the contrary, when the second correlation coefficient ρ2(*m,n*) is smaller than the second threshold value (step S57: Yes), the assigning unit 23 proceeds to step S54 where the assigning unit 23 assigns a non-orthogonal port to the pair of UEs (m,n).

When the first correlation coefficient ρ1(*m,n*) of the pair of UEs is smaller than the first threshold value, the base station 2C according to the fifth embodiment assigns the non-orthogonal port to the pair of UEs. As a result, the base station 2C is designed to improve the level of precision for assigning the non-orthogonal ports.

When the first correlation coefficient ρ1(*m,n*) of the pair of UEs is not smaller than the first threshold value, while the second correlation coefficient ρ2(*m,n*) of the pair of UEs is smaller than the second threshold value, the base station 2C assigns the non-orthogonal port to the pair of UEs. As a result, the base station 2C is designed to improve the level of precision for assigning the non-orthogonal ports, while taking the first correlation coefficient ρ1(*m,n*) and the second correlation coefficient ρ2(*m,n*) into account.

Further, when the first correlation coefficient ρ1(*m,n*) of the pair of UEs is not smaller than the first threshold value, while the second correlation coefficient ρ2(*m,n*) of the pair of UEs is not smaller than the second threshold value, the base station 2C assigns the orthogonal port to the pair of UEs. As a result, the base station 2C is designed to improve the level of precision for assigning the orthogonal ports, while taking the first correlation coefficient ρ1(*m,n*) and the second correlation coefficient ρ2(*m,n*) into account.

In the fifth embodiment above, the example is explained in which the correlation coefficient calculated by using the channel response vectors is used as the second correlation coefficient. However, it is also acceptable to use a correlation coefficient calculated by using the transmission weight vectors, and the configuration may be modified as appropriate.

The base station 2 according to the first embodiment above is configured so that the scheduling unit 22 calculates the correlation coefficient for each of the pairs of UEs, whereas the assigning unit 23 assigns the orthogonal ports and the non-orthogonal ports by using the correlation coefficients corresponding to the pairs of UEs. However, the present disclosure is not limited to this example. For instance, functions of the assigning unit 23 may be executed by the scheduling unit 22. This embodiment will be explained below as a sixth embodiment.

[f] Sixth Embodiment

Figure 12:
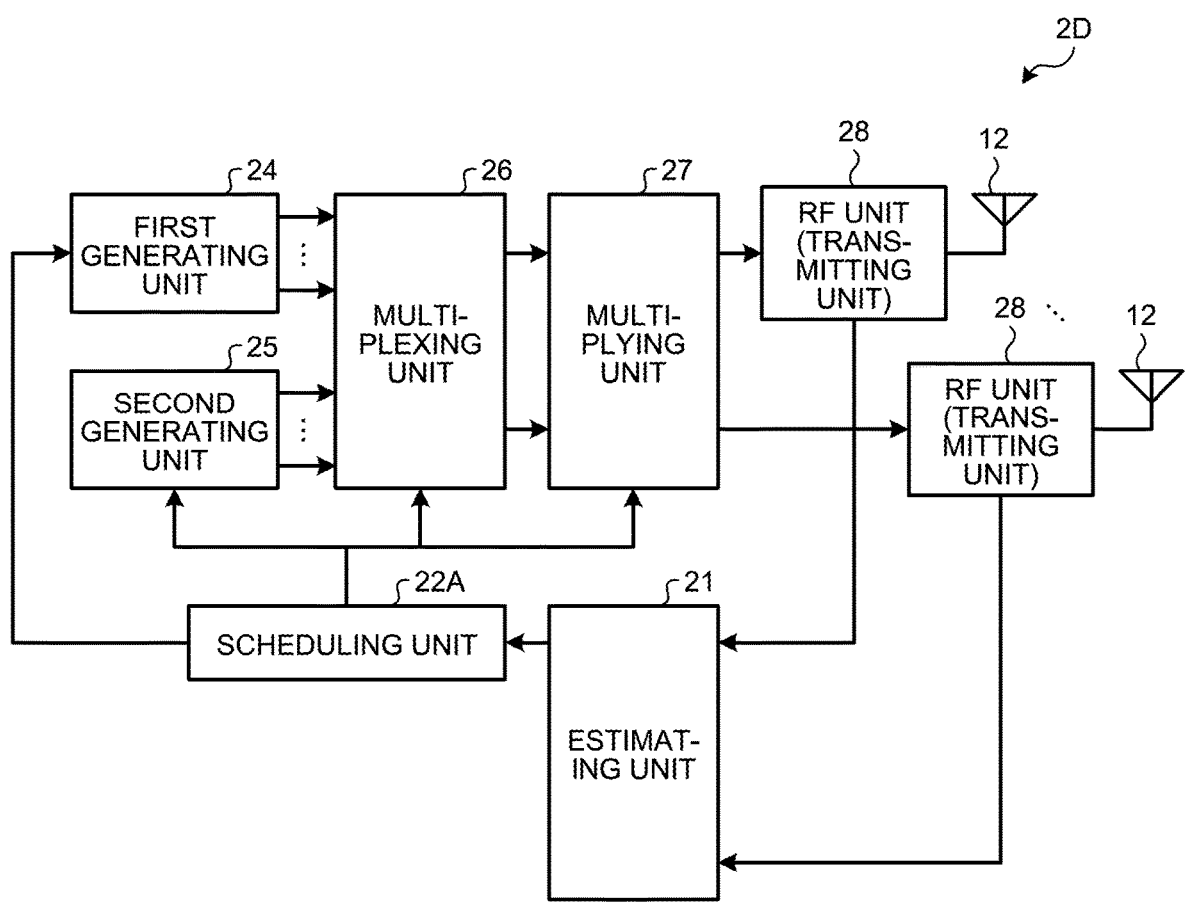
FIG. 12 is a block diagram illustrating an example of a hardware configuration of a base station according to a sixth embodiment.
Figure 13:
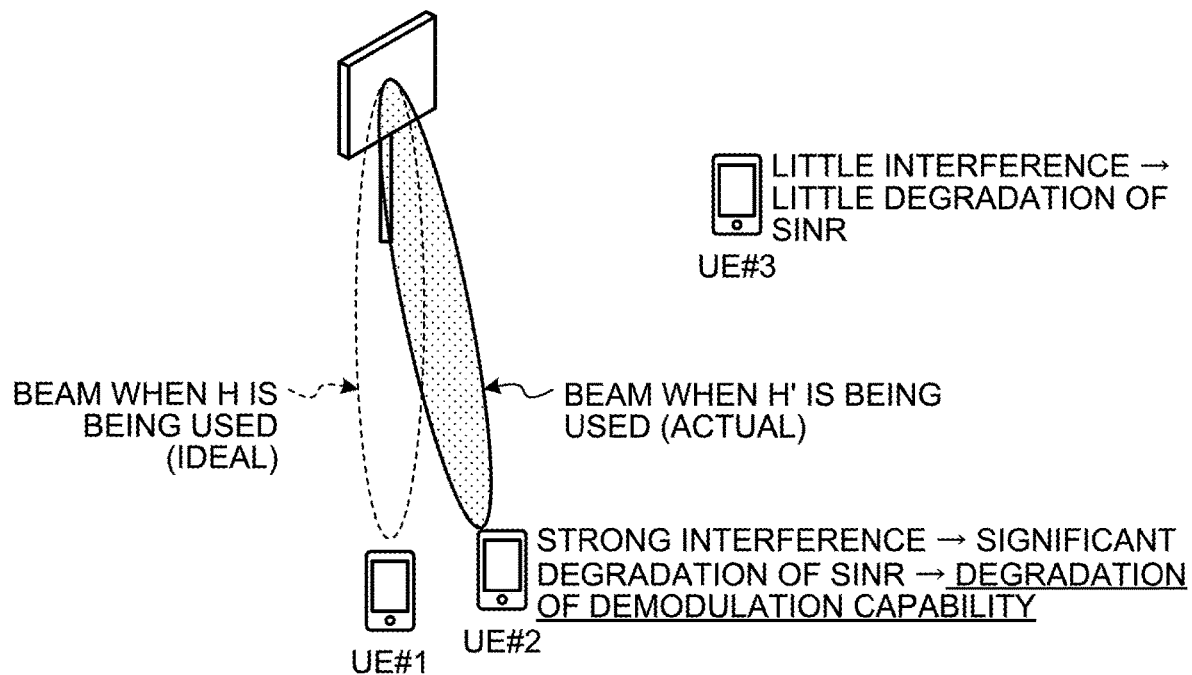
FIG. 13 is a drawing for explaining an example of a cause of degradation of an SINR between a base station and UEs.

FIG. 12 is a block diagram illustrating an example of a hardware configuration of a base station 2D according to a sixth embodiment. Some of the constituent elements that are duplicates of those in the base station 2 illustrated in FIG. 1 will be referred to by using the same reference characters, and the explanations of the duplicate configurations and operations will be omitted. The base station 2D illustrated in FIG. 12 is different from the base station 2 in that the functions of the assigning unit 23 are executed by a scheduling unit 22A. The scheduling unit 22A selects a K-th UE 3. As the K-th UE 3, the scheduling unit 22A selects such a UE 3 that maximizes a selection metric expressed in Mathematical Formula 8.

$$M_{k,n} = \sum_{m \in (A \cup n)} \frac{R(\gamma_{k,n,m})}{\overline{R}_m} \quad (8)$$

$R(.)$: Instantaneous throughput expressed with function of *SINR*

$\overline{R}_m$: Average throughput of terminal #*m*

$A$: Set made up of terminals already selected

Further, by using Mathematical Formulae 9 and 10, the scheduling unit 22A is able to skip the calculation of the correlation coefficients. Further, the scheduling unit 22A performs one selected from between the first assigning process and the second assigning process, by using the correlation coefficient of each of the pairs of UEs calculated while using Mathematical Formula 10.

$$\gamma_{k,n,m} = (1 - C_{k,n,m}) \frac{P_{total} \|h_m\|^2}{k\sigma_m^2} \quad (9)$$

$P_{total}$: Transmission power level $\sigma_m^2$: Distributed amount of noise $$C_{k,n,m} = \sum_{\substack{m' \in (A \cup n) \\ m' \neq m}} \rho_{m,m'} \quad (10)$$

The scheduling unit 22A provided in the base station 2D according to the sixth embodiment is able to obtain the correlation coefficient when selecting the UE 3 that maximizes the selection metric. Consequently, in comparison to the base station 2 according to the first embodiment, it is possible to reduce the number of component parts used in the assigning unit 23.

In the embodiments described above, when the correlation coefficients calculated by using the reception power vectors are used, it is assumed that distributed antennas are used, for example; however, the present disclosure is also applicable to integrated antennas. Further, when the correlation coefficients based on the channel response vectors and the correlation coefficients based on the vectors related to the beams are used, it is assumed that integrated antennas are used, for example; however, the present disclosure is also applicable to distributed antennas. Furthermore, when both integrated and distributed antennas are used in a mixed manner at a base station, it is also acceptable to realize separation with power orthogonality in terms of the transmission points, while realizing separation within each transmission point by using the channel correlation.

Further, in the embodiments described above, the correlation coefficients are calculated by using the propagation path information such as, for example, the reception power vectors, the channel response vectors, the transmission weight vectors, or the like. However, possible modes of the propagation path information are not limited to these examples and may be modified as appropriate.

According to at least one aspect of the present disclosure, it is possible to improve the demodulation capability for the data signals, by assigning an optimal reference signal to each of the terminal devices.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station apparatus comprising a processor configured to:
    transmit, to each of terminal devices, a data signal and a reference signal for demodulating the data signal while the data signal and the reference signal are spatially multiplexed, by forming a plurality of beams while using a plurality of antenna elements;
    calculate an index value related to correlation among the terminal devices, on a basis of propagation path information between any of the terminal devices subject to the spatial multiplexing; and
    assign the reference signals to the terminal devices subject to the spatial multiplexing in accordance with the index values among the terminal devices so as to assign a first reference signal from among the reference signals to the terminal devices in such a manner that, the larger the index value is, the higher is a priority level for assigning the first reference signal.

2. The base station apparatus according to claim 1, wherein the processor is further configured to:
    assign, when there is no more first reference signal left that is available to be assigned to the terminal devices, a second reference signal from among the reference signals.

3. The base station apparatus according to claim 2, wherein the processor is further configured to:
    assign one selected from between: the first reference signal that uses mutually-different time periods, frequencies, or codes among the reference signals; and the second reference signal that uses mutually-different signal sequences while using a mutually same time period, frequency, or code among the reference signals.

4. The base station apparatus according to claim 2, wherein the processor is further configured to:
    calculate a first index value related to correlation among the terminal devices on a basis of a vector inner product value related to a reception power level from the base station apparatus thereof for any of the terminal devices subject to the spatial multiplexing;
    calculate a second index value related to correlation among the terminal devices on a basis of a vector inner product value related to a channel response between the terminal devices subject to the spatial multiplexing and the base station apparatus thereof;
    assign, when the first index value between terminal devices is smaller than a first threshold value, the second reference signal to the terminal devices related to the first index value; and
    assign, when the first index value between terminal devices is not smaller than the first threshold value while the second index value between the terminal devices is not smaller than a second threshold value, the first reference signal to the terminal devices related to the second index value.

5. The base station apparatus according to claim 1, wherein the processor is further configured to:
    calculate the index values among the terminal devices, on a basis of a vector inner product value related to a channel response between any of the terminal devices subject to the spatial multiplexing and the base station apparatus thereof.

6. The base station apparatus according to claim 1, wherein the processor is further configured to:
    calculate the index values among the terminal devices, on a basis of a vector inner product value related to a reception power level from the base station apparatus thereof for any of the terminal devices subject to the spatial multiplexing.

7. The base station apparatus according to claim 1, wherein the processor is further configured to:
    calculate the index values among the terminal devices, on a basis of a vector inner product value related to a beam applied to the data signals transmitted to any of the terminal devices subject to the spatial multiplexing.

8. An assigning method for executing a process comprising:
    transmitting, to each of terminal devices, a data signal and a reference signal for demodulating the data signal while the data signal and the reference signal are spatially multiplexed, by forming a plurality of beams while using a plurality of antenna elements;
    calculating an index value related to correlation among the terminal devices, on a basis of propagation path information between any of the terminal devices subject to the spatial multiplexing; and
    assigning the reference signals to the terminal devices subject to the spatial multiplexing in accordance with the index values among the terminal devices so as to assign a first reference signal from among the reference signals to the terminal devices in such a manner that, the larger the index value is, the higher is a priority level for assigning the first reference signal.

* * * * *